June 7, 1966 N. E. FAUST 3,254,636
INTERNAL COMBUSTION ENGINE
Filed Dec. 4, 1963 2 Sheets-Sheet 2
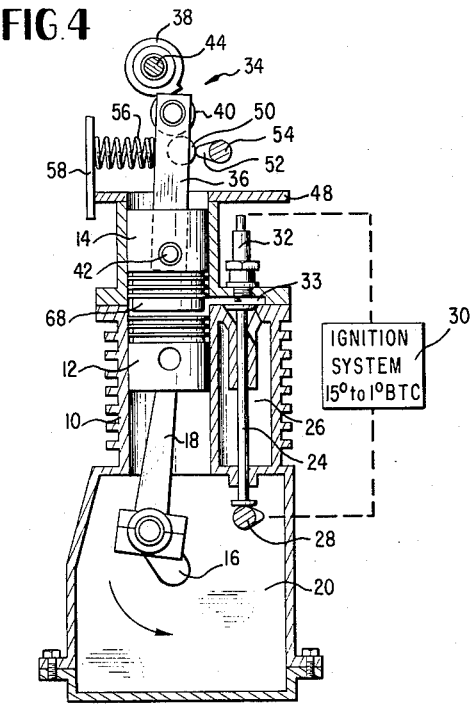
FIG.4
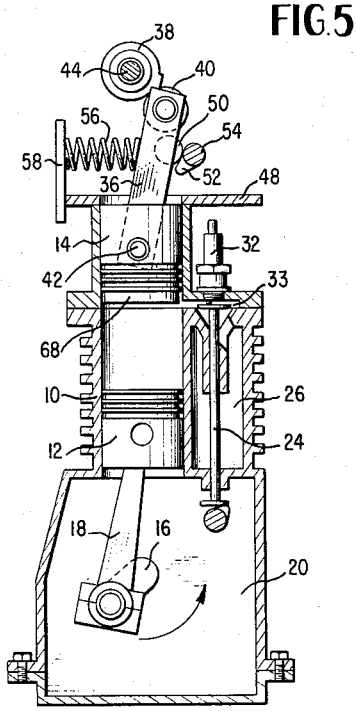
FIG.5
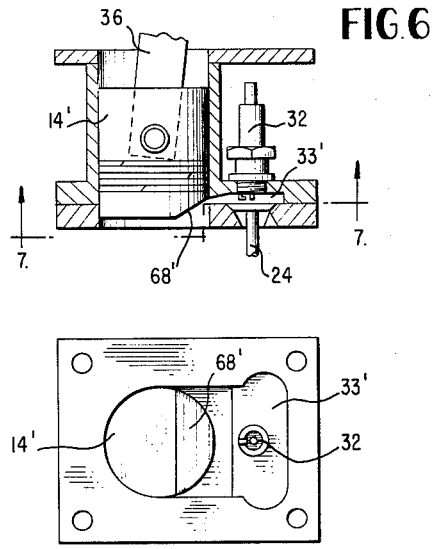
FIG.6
FIG.7
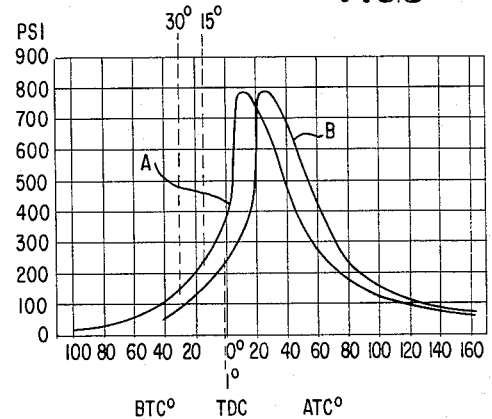
FIG.9
INVENTOR.
NILE E. FAUST
BY *Rines and Rines*
ATTORNEYS

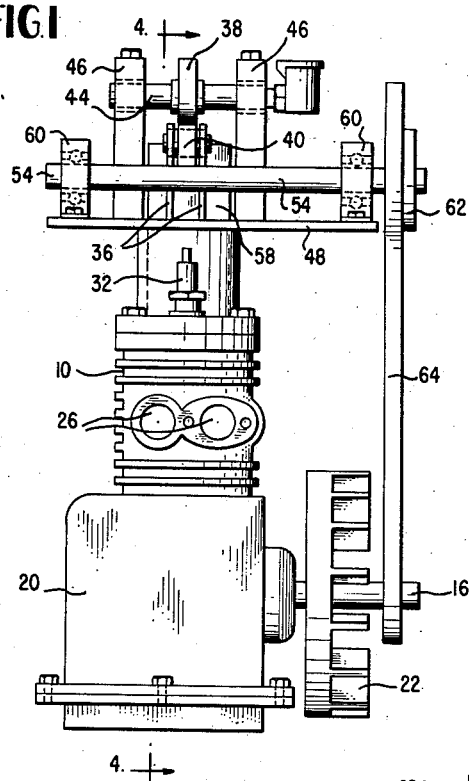

United States Patent Office 3,254,636
Patented June 7, 1966

3,254,636
INTERNAL COMBUSTION ENGINE
Nile E. Faust, 296 S. Main St., Concord, N.H.
Filed Dec. 4, 1963, Ser. No. 327,927
15 Claims. (Cl. 123—78)

This invention relates to internal combustion engines, and more particularly to an improved engine of the type employing an auxiliary piston.

In conventional gasoline and diesel engines the maximum combustion pressure acting upon the piston and the crankshaft occurs so close to top dead center, where crankshaft leverage is minimal, that the resultant combustion knock, engine roughness, and accompanying deterioration of pistons, rings, and related parts severely limit the power obtainable. Combustion pressures rise faster at times (200 to 800 p.s.i. rise per crank angle degree) than can be tolerated even in the most advanced engine structure that modern metallurgy can provide. Some relief is obtained by sophisticated compounding of fuels and ingenious combustion chamber design, but the aforementioned limiting factors prevent the use of compression ratios in the range of between 20 to 1 and 40 to 1, and create substantial problems in the compression ratio range between 10 to 1 and 20 to 1. The development of improved fuels has permitted some increase in compression ratio and engine power, but engines requiring high grade fuel can only be operated where the fuel is readily available.

Attempts have been made to solve the foregoing problem by utilizing an auxiliary piston which follows the main piston after the latter passes top dead center of the compression stroke, and by igniting the fuel well after top dead center, when the crank angle is more favorable. However, I have discovered that ignition in engines of this type has been too far after dead center to permit complete combustion and too late in the power stroke to develop maximum torque. Moreover, the mechanical construction of such engines is complicated, lacks good dynamic balance, and cannot be readily adjusted.

It is accordingly a principal object of the invention to provide an improved internal combustion engine of the type having cooperating main and auxiliary piston.

A further object of the invention is to provide an engine of the foregoing type in which efficiency, horsepower, torque, and smoothness are substantially increased by a critical relationship between the operation of the pistons and the ignition of the combustible fuel, and in which fuel consumption, fuel sensitivity, and engine weight per horsepower are reduced.

Still another object of the invention is to provide an engine of the foregoing type in which the compression ratio can be readily adjusted and can be adjusted automatically in response to an operating condition of the engine while the engine is running.

An additional object of the invention is to provide an engine of the foregoing type having an improved mechanism for prescribing the movement of the auxiliary piston.

Briefly stated, a preferred internal combustion engine of the invention comprises a cylinder with main and auxiliary pistons reciprocative therein from opposite ends thereof. The main piston is connected to a crank shaft in the usual manner, while the auxiliary piston is moved by a unique toggle linkage which causes the auxiliary piston to follow the main piston after the latter passes its top dead center position. A combustible fuel is ignited within a critical period before the top dead center position of the main piston and produces maximum combustion pressure well after the top dead center position, more complete combustion, and improved utilization of combustion pressures. The toggle linkage is constructed so that it may be readily adjusted to vary the compression ratio, as by a control responsive to an operating condition of the engine.

The foregoing and other objects, advantages, and features of the invention and the manner in which the same are accomplished will become more readily apparent upon consideration of the following detailed description of the invention taken in conjunction with the accompanying drawings, which illustrate preferred and exemplary embodiments, and wherein:

FIGURE 1 is a side elevation view of an engine constructed in accordance with the invention;
FIGURE 2 is an end elevation view of the engine;
FIGURE 3 is a top plan view of the engine;
FIGURE 4 is a sectional view taken along the line 4—4 of FIGURE 1;
FIGURE 5 is a similar sectional view with the parts shown at another portion of the engine cycle;
FIGURE 6 is a fragmentary sectional view illustrating a modification;
FIGURE 7 is a sectional view taken along line 7—7 of FIGURE 6;
FIGURE 8 is a partially diagrammatic elevation view illustrating another modification;
FIGURE 9 is an explanatory graph; and
FIGURE 10 is a view similar to FIGURE 2 of an engine having a different operating ratio.

Refering to the drawings, and initially to FIGURES 4 and 5 thereof, the illustrated engine of the invention comprises a cylinder 10 having a main piston 12 and an auxiliary piston 14 reciprocative therein from opposite ends thereof. The term "cylinder" is utilized in its generic sense to designate the portion of the engine in which the pistons reciprocate, whether comprised of a single chamber or a plurality of communicating chambers. Although a single cylinder is shown, the invention can also be employed in engines having plural cylinders. In the form shown the cylinder comprises mating upper and lower parts and is arranged with its axis vertical, the main piston entering the cylinder from below and the auxiliary piston entering the cylinder from above. The vertical cylinder arrangement is illustrative, and the term "top dead center" is used generically herein. The main piston is connected to a crankshaft 16 by a connecting rod 18 in the usual manner. The engine may have a conventional crankcase 20 with the usual bearings for the crankshaft. One end of the crankshaft extends from the crankcase and supports a conventional flywheel 22 as shown in FIGURES 1 and 2. The valve and manifold arrangements may follow conventional practices, a typical side valve being shown at 24 in FIGURES 4 and 5, and the intake and exhaust manifolds being shown at 26 in FIGURE 1. The valves may be operated from the conventional camshaft 28. The ignition system employed will depend upon the engine type. For example, in a four-cycle gasoline engine of the type shown a conventional spark ignition system 30, connected to a spark plug 32 in a combustion chamber 33, may be employed. In a diesel engine the fuel may be injected at the proper instant for compression ignition. The illustrated spark ignition system 30 may be actuated from the camshaft 28, for example, in timed relationship to the operation of the pistons, as will be described hereinafter.

The auxiliary piston 14 is operated by a toggle linkage 34 comprising a first link 36 and a second link 38. In the form shown link 36 is composed of a pair of parallel link parts embracing a roller or pin 40 at one end and having a pivotal connection 42 to the piston 14 at the other end. Link rod 38 is supported for turning movement about the axis of a shaft 44, which is mounted upon a pair of posts 46 (FIGURE 1) on a mounting plate 48 at the top of the engine. Roller 40 engages the perimeter of link 38 in rolling pivotal contact. Just below roller 40 link 36 supports a cam follower roller 50 engaging a cam 52 on a camshaft 54. The cam lobe urges the link 36 in a direction to extend the toggle linkage 34 by moving link 36 toward (but not to) a position of alignment with the axis of the cylinder 10. The stroke of the piston 14 is dependent upon the configuration of the link 38, the position of the axis of the shaft 44, and the configuration of cam 52. In opposition to the movement imparted by cam 52 the linkage is moved by means of a return spring 56 compressed between the side of link 36 and a fixed abutment surface 58 upstanding from plate 48.

As shown in FIGURES 1 and 3, camshaft 54 is rotatably mounted in bearings 60 upon plate 48 and extends parallel to shaft 44, shaft 44 being located at one side of the axis of cylinder 10 (see FIGURE 4) and shaft 54 being located at the opposite side. As shown in FIGURE 2, the sprocket wheel 62 is fixed to one end of shaft 54 and is driven by a chain or belt 64 from a drive sprocket wheel 66 fixed to the crankshaft 16.

Both pistons are provided with the usual piston rings. The auxiliary piston also has a head elongation 68 which is capable of extension into the portion of cylinder 10 below the side chamber 33, that is, into the portion of the cylinder normally forming a part of the working space of piston 12 adjacent its top dead center position. In the form shown in FIGURES 4 and 5 the elongated head 68 is of reduced diameter (by, for example, ⅛ inch) so as to permit communication between the working space of the cylinder and the side chamber 33 even when the piston 14 extends beyond the side chamber. In the modification illustrated in FIGURES 6 and 7 the auxiliary piston 14' has a chamfered end 68' to permit such communication. Further reference to these configurations will be made hereinafter.

As indicated in FIGURE 4, the configuration of cam 52 is such that the auxiliary piston 14 follows the main piston 12 downwardly to a predetermined point and at a rate determined by the shape of cam 52, after which piston 12 moves away from piston 14. The downward movement of piston 14 maintains the maximum compression pressure developed by main piston 12 on its upward, compression stroke. In a four-cycle engine piston 14 may move downward with each stroke of piston 12 if camshaft 54 runs at the same speed as crankshaft 16 and the cam 52 has a single lobe, or piston 14 may move downward only on the power stroke if camshaft 54 runs at one-half the crankshaft speed. If camshaft 54 is driven at the same speed as the crankshaft, the downward movement of piston 14 during the induction stroke may necessitate supercharging. However, there are definite advantages in driving the camshaft at the same speed as the crankshaft. For example, the lobe of cam 52 can be almost twice as long in periphery as for half-speed operation, and the shape of the cam need not be as steep. Lubrication to piston 14 and its rings is assisted by virtue of the wiping of oil onto the top portion of the cylinder wall during the induction stroke of piston 12. Furthermore, sprocket wheel 62 can be made much smaller, reducing the overall height of the engine. The smaller sprocket wheel can be more quickly accelerated, with less strain on the drive train. Such an engine is shown in FIGURE 10, wherein sprocket wheel 62A on shaft 54 is the same size as sprocket wheel 66.

In auxiliary piston engines it has heretofore been the practice to provide ignition after the top dead center position of the main piston. Contrary to this practice, I have discovered that much greater efficiency, more complete combustion, much greater torque and horsepower (up to double), and substantially smoother operation result if ignition is within a critical range before top dead center. Moreover, engine size and weight are reduced; fuel consumption is less; and the engine is less sensitive to fuel grade. FIGURE 9 is a graph illustrating cylinder pressure versus crankshaft angle, for normal rate of flame burning and normal rate of pressure rise, 10 to 1 compression ratio, and an engine speed of 2000 to 3000 r.p.m. Curve A is for a conventional engine (without an auxiliary piston), and curve B is for an engine constructed in accordance with the invention. With the standard engine ignition occurs within the range of 15 to 30 degrees before top dead center, and maximum pressure is developed at about 10 degrees after top dead center, at which time the crankshaft leverage is quite low. In the engine of the invention, however, maximum pressure is developed in the vicinity of 30 degrees after top dead center. Unlike prior auxiliary piston engines, in the engine of the invention ignition is within the critical range of from 1 degree to 15 degrees before top dead center in order to obtain maximum benefit from the increased crankshaft leverage and to approach full combustion of the fuel charge. Hence, in the engine of the invention ignition is controlled to occur at a point *prior* to top dead center with the engine running (although, in starting, ignition may be after top dead center to avoid kicking back and reduce starter load). This allows approximately 25 degrees of crank angle for pressure rise in the combustion process, and peak pressures occur at a point within 30 degrees after top dead center, depending upon the combustion chamber design, the shape of the piston head 14, and fuel characteristics. From the curves in FIGURE 9 can readily be seen the substantial increase in inch-pounds acting upon the crankshaft when the combustion pressures are caused to act 15 to 30 degrees later than in the conventional engine. Spark knock, premature combustion, detonation, thudding, and engine roughness are avoided, and very high compression ratios can be used. Moreover, any rapid pressure rise (abnormal combustion), if it occurs, will be at least 15 degrees farther beyond top dead center than in conventional engines and can be readily translated into rotary motion.

The extent of movement required of piston 14 is determined by the crankshaft angle at which the piston is to become stationary relative to piston 12 during the power stroke. This angle can vary from 1 degree after top dead center to 30 degrees after top dead center, depending upon the factors determining pressure rise, as set forth above. The profile of cam 52 determines the accuracy with which piston 14 follows piston 12. In some instances it may be desirable to have piston 14 move downward faster than piston 12. In diesels this will ensure maximum compression slightly after top dead center and will avoid loss of mechanical efficiency in building up to peak compression pressures before top dead center is reached. Also, this will make up for pressure loss due to "blow-by," especially at low speeds. During the power stroke cam 52 extends the toggle linkage 34, but does not straighten it, after which time the linkage is contracted by virtue of the bias of spring 56. During the exhaust stroke piston 14 remains retracted, so as not to restrict the exhaust gases. As indicated previously, the piston 14 remains in a retracted position during the intake stroke if the camshaft 54 is driven at half crankshaft speed.

Because the toggle linkage does not straighten fully, little pressure exerted by cam 52 enables considerable movement of piston 14, and little spring pressure is required to contract the linkage. Operation of the linkage close to straight position, to maintain cylinder pressure, provides quick and positive cam action, particularly important with the 2:1 ratio of FIGURE 2.

In engines having side valves, as illustrated, the burning pressure, which starts at the spark plug 32 or fuel injection region, can be restricted somewhat as it enters the cylinder above piston 12. As indicated previously, this may be accomplished by the reduced diameter elongated head 68 of piston 14 in conjunction with the constricted side chamber 33, or by the use of the bevelled head 68' (FIGURE 6) having the same diameter as the cylinder but with a passageway machined on the side of the elongated piston head facing combustion chamber 33'. The configuration of the machined passageway may vary somewhat in size and shape to provide design flexibility for turbulence control and control of combustion pressure rise over the piston 12. As shown in FIGURE 6, the combustion chamber 33' may have a tapered shape complementing the bevelled piston. Since there is a separate region at 33 for the spark, removed from the region where the burning takes place, the engine is adapted for use with stratified fuel feeds, i.e., where rich mixtures are used near the spark gap and lean mixtures elsewhere.

The toggle linkage of the invention is especially adaptable to compression ratio control. This may be accomplished, for example, by off-setting a portion of the shaft supporting the link 38, as indicated at the central region of the shaft 44' in FIGURE 8. Rotation of the shaft, as by a control lever 70 affixed to one end thereof, varies the location of the effective turning axis of link 38, producing an accompanying variation in the stroke of the auxiliary piston. In accordance with the embodiment of the invention illustrated in FIGURE 8 the variation of compression ratio is automatic and is responsive to a condition of the engine while the engine is running. Thus a control 72 is shown connected between a sensor 74 and the rod 70. The sensor may be vacuum or torque responsive, for example, and is connected to an appropriate portion of the engine, such as the intake manifold or the crankshaft. When the engine is operating under light load, as when driving a vehicle on level road, there are no spark knock or fuel problems. However, under heavy load, as on steep upgrades, where it is harder to accelerate, it is desirable to reduce the compression ratio to accommodate the fuel being used and to avoid knock.

Lubrication for the auxiliary piston of the invention and the associated toggle linkage may be provided, for example, by a drilled passage in the shaft 44 connected to the oil pump of the engine. Excess oil may be returned to the pump, so that in effect the auxiliary piston operates as a dry sump design.

While preferred embodiments of the invention have been shown and described, it will be apparent to those skilled in the art that changes can be made in these embodiments without departing from the principles and spirit of the invention, the scope of which is defined in the appended claims. For example, the invention is useful in the larger piston engines, such as those employed in ships, to prevent the pistons from stopping at dead center, in addition to the other advantages of the invention. Accordingly, the foregoing embodiments are to be considered illustrative, rather than restrictive of the invention, and those modifications which come within the meaning and range of equivalency of the claims are to be included therein.

The invention claimed is:

1. In an internal combustion engine, a cylinder with a main piston and an auxiliary piston reciprocative in said cylinder from opposite ends thereof, said main piston being connected to a crankshaft, means for causing ignition of a combustible fuel in said cylinder substantially within the range of 15 degrees to 1 degree before the top dead center position of said main piston, and means for causing said auxiliary piston to move in the same direction with respect to said cylinder ends as said main piston and to follow said main piston after said main piston passes said dead center position, whereby combustion pressure rises over approximately 25 degrees after ignition and maximum pressure in said cylinder occurs at a favorable crank angle substantially within 30 degrees after said dead center position.

2. The engine of claim 1, further comprising means fo adjusting the stroke of said auxiliary piston to vary the compression ratio of said engine.

3. The engine of claim 1, the last-mentioned means comprising a toggle linkage and means for extending and contracting the same.

4. The engine of claim 1, said cylinder having a combustion chamber laterally adjacent the free end of said main piston at said dead center position, said auxiliary piston being shaped to permit communication between said cylinder and said chamber after said auxiliary piston passes said dead center position.

5. The engine of claim 4, said auxiliary piston having a free end of reduced diameter.

6. The engine of claim 4, said auxiliary piston having a chamfered free end.

7. An internal combustion engine comprising a cylinder having a main piston and an auxiliary piston reciprocative in said cylinder from opposite ends thereof, a racnkshaft connected tao said main piston, a toggle linkage connected to said auxiliary piston, a camshaft having cam means for extending said linkage, means driving said camshaft in timed relation to said crankshaft for causing said auxiliary piston to move in the same direction with respect to said cylinder ends as said main piston and to follow said main piston after the latter passes its top dead center position, spring means for contracting said linkage, means for causing ignition of a combustible fuel in said cylinder, and means for adjusting the stroke of said toggle linkage in response to an operating condition of said engine while the engine is running.

8. The engine of claim 7, further comprising means for actuating said ignition means substantially between 15 degrees and 1 degree before said dead center position.

9. An internal combustion engine comprising a cylinder having a main piston and an auxiliary piston reciprocative in said cylinder from opposite ends thereof, a crankshaft connected to said main piston, a toggle linkage connected to said auxiliary piston, a camshaft having cam means for extending said linkage, means driving said camshaft in timed relation to said crankshaft causing said auxiliary piston to follow said main piston after the latter passes its top dead center position, spring means for contracting said linkage, means for causing ignition of a combustible fuel in said cylinder, and means for adjusting the stroke of said toggle linkage in response to an operating condition of said engine, said linkage comprising a first link pivotally coupled to said auxiliary piston and a second link pivotally coupled to said first link, said first link having adjacent its coupling to said second link a follower roller engaging said cam means, said cam means being arranged to move said first link toward but not to a position of alignment with said cylinder.

10. The engine of claim 9, said second link being supported for turning movement about an axis spaced from said first link, said adjusting means comprising means for adjusting the position of said axis.

11. The engine of claim 10, said adjusting means comprising an off-set shaft and control means responsive to said engine for turning said shaft.

12. In an internal combustion engine of the type having a cylinder with a main piston and an auxiilary piston reciprocative in said cylinder from opposite ends thereof, a toggle linkage having a first link pivotally coupled to said auxiliary piston and a second link pivotally coupled to said first link and turnable about an axis spaced from said first link, means for extending said linkage to move said auxiliary piston toward said main piston, and means for contracting said linkage to move said auxiliary piston away from said main piston, said extending means comprising cam means engaging said first link adjacent the coupling of said first and second links.

13. The internal combustion engine of claim 12, said contracting means comprising spring means biasing said first link to move in opposition to said cam means.

14. The internal combustion engine of claim 12, said links being coupled for rolling contact.

15. The internal combustion engine of claim 12, further comprising means for varying the position of the turning axis of said second link.

References Cited by the Examiner

UNITED STATES PATENTS

| | | | |
|---|---|---|---|
| 1,138,919 | 5/1915 | Willey et al. | 123—78 |
| 1,283,331 | 10/1918 | Seitz | 123—78 |
| 1,317,091 | 10/1919 | Matthewman | 123—78 |
| 1,914,707 | 6/1933 | Wolf | 123—78 |
| 2,018,944 | 10/1935 | Castle | 123—78 |
| 2,120,012 | 6/1938 | Andreau | 123—48 |
| 2,145,017 | 1/1939 | Tsuneda | 123—48 |
| 2,382,362 | 8/1945 | Weinreb | 123—78 |

FOREIGN PATENTS 102,852  1/1917  Great Britain.

OTHER REFERENCES

Pye: The Internal Combustion Engine, Oxford at the Clarendon Press, 1931, page 194.

MARK NEWMAN, *Primary Examiner.*

FRED E. ENGELTHALER, *Examiner.*